United States Patent Office 2,872,332
Patented Feb. 3, 1959

2,872,332

DRYING OIL COMPOSITIONS CONTAINING N-SUBSTITUTED HYDROXY BUTYRYL AMIDE

Richard A. Grifo, Easton, Pa., and Raymond L. Mayhew, Phillipsburg, N. J., assignors to General Aniline & Film Corporation, New York, N. Y., a corporation of Delaware No Drawing. Application November 30, 1956
Serial No. 625,223

6 Claims. (Cl. 106—252)

This invention relates to drying oil compositions embodying N-alkyl-γ-hydroxycarboxylic acid amides, which, when present in fairly low concentrations, have the property of imparting thixotropic and thickening characteristics.

To provide drying oils and drying oil compositions possessing the foregoing characteristics constitutes the primary object of the present invention.

Other objects and new and useful features of the invention will become more clearly apparent from the following description.

The above and other objects of the present invention are accomplished by adding to any drying oil composition a thixotropic and thickening amount of an N-substituted-γ-hydroxycarboxylic acid amide characterized by the following general formula:

$$\begin{array}{c} \text{OH} \quad\quad\quad \text{O} \quad\quad R^1 \\ | \quad\quad\quad\quad || \quad\quad\quad / \\ R-\text{CH}-\text{CH}_2\text{CH}_2\text{CONHCH} \\ \quad\quad\quad\quad\quad\quad\quad\quad\quad\quad \backslash R^{11} \end{array}$$

wherein R represents either hydrogen or a methyl group, R¹ represents an alkyl radical containing from 10 to 22 carbon atoms, e. g. decyl, undecyl, undecylenyl, hendecyl, dodecyl, tridecyl, tetradecyl, cetyl, myristolenyl, pentadecyl, heptadecyl, hexadecyl, hexadecenyl, octadecyl, octadecenyl, octadecadienyl, oleyl, elaidyl, erucyl, etc.; an aryl radical, e. g. phenyl, tolyl, cumyl, naphthyl, etc., or an aralkyl radical containing from 7 to 24 carbon atoms, e. g. phenethylbenzyl, butylbenzyl, amylbenzyl, octylbenzyl, dioctylbenzyl, diamylbenzyl, nonylbenzyl, dodecylbenzyl, abietinyl, dihydroabietinyl, etc. and mixtures of such radicals, and R¹¹ represents hydrogen or an alkyl aryl or aralkyl radical of the same value as recited for R¹, the total number of carbon atoms constituting the alkyl aryl and aralkyl groups in both R¹ and R¹¹ being a minimum of 10 and not more than 24 carbon atoms.

In preparing the new compounds, approximately 1 mole of an aliphatic aryl or aralkyl amine wherein the aliphatic amine contains from 10 to 22 carbon atoms and the aryl and aralkyl radical contains from 7 to 24 carbon atoms, is heated to approximately 80–90° C. and approximately one mole of either γ-butyrolactone or γ-valerolactone added slowly over a period of time ranging from 15–45 minutes while maintaining the same temperature range. After the addition is complete, the temperature is raised to 90–95° C. and held for approximately one-half to one and one-half hours. At the end of this time, titration of the residual amine in the reaction mixture will indicate the extent of completion. Normally, within this time, the reaction is substantially complete. It is to be noted that the rate and time of addition of the lactone is not material or critical and will vary with the amount of the amine or mixture of amines employed. The aliphatic aryl or aralkyl amine and the lactone are reacted preferably in substantial equimolar amounts. In other words the reaction is operable to give the desired product when substantially one mole of the said amines is reacted with one mole or a slight excess above one mole of the lactone. It is desirable that the temperature ranges be strictly maintained otherwise—at higher temperatures—the reaction will be beset with side reactions resulting in the formation of an impure product. Holding the reaction at 90–95° C. for over one and one-half hours will have no detrimental effect on the reaction itself or the resulting final product.

The foregoing process and the products resulting therefrom are disclosed in application Ser. No. 625,224 filed on November 30, 1956. The complete disclosure of this application is incorporated herein by reference to the various compounds per se and the methods of making them which are useful as thixotropic and thickening agents and to the method of preparing the same.

As illustrative examples of the thixotropic and thickening agents characterized by the foregoing formula, the following may be mentioned:

(1)
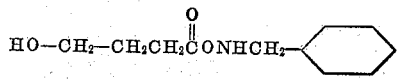

The reaction product of benzylamine and γ-butyrolactone.

(2) $\text{HO}-\text{CH}_2-\text{CH}_2-\text{CH}_2-\text{CONHCH}^2(\text{CH}_2)_8\text{CH}_3$ The reaction product of N-decylamine and γ-butyrolactone.

(3)
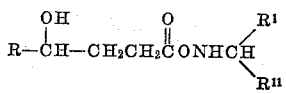

The reaction product of N-decylamine and γ-valerolactone.

(4) $\text{HO}-\text{CH}_2-\text{CH}_2-\text{CH}_2\text{CONHCH}_2(\text{CH}_2)_{10}\text{CH}_3$ The reaction product of N-dodecylamine and γ-butrolactone.

(5) $\text{HO}-\text{CH}_2-\text{CH}_2-\text{CH}_2\text{CONHCH}_2(\text{CH}_2)_{14}\text{CH}_3$ The reaction product of N-cetylamine and γ-butyrolactone.

(6) $\text{HO}-\text{CH}_2-\text{CH}_2-\text{CH}_2\text{CONHCH}_2(\text{CH}_2)_{16}\text{CH}_3$ The reaction product of octadecylamine and γ-butyrolactone.

(7) The reaction product of 1 mole (86.1 grams) of γ-butyrolactone with 1 mole (274 grams) of a commercially available mixture of amines having the following composition: hexadecylamine 10%, octadecylamine 10%, octadecenylamine 35%, octadecadienylamine 45%.

(8) The reaction product of 1 mole (86.1 grams) of γ-butyrolactone and 1 mole (365 grams) of a commercially available mixture of amines having the following composition: octadecenylamine 15%, octadecadienylamine 15%, abietylamine 70%.

(9) The reaction product of 1 mole (86.1 grams) of γ-butyrolactone and 1 mole (276 grams) of a commercially available mixture of amines having the following composition: hexadecylamine 6%, octadecylamine 93%, octadecenylamine 1%.

(10) The reaction product of 1 mole (86.1 grams) of γ-butyrolactone and 1 mole (317 grams) of a commercially available primary amine made from a modified rosin (dehydroabietylamine) having the following formula:

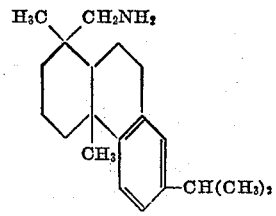

(11) The reaction product of 0.2 mole (7.2 grams) γ-butyrolactone with 0.2 mole (58.9 grams) of the monoamide prepared from coconut oil and ethylene-diamine in the usual manner.

(12) The reaction product of 1 mole (86.1 grams) γ-butyrolactone with 0.2 mole (65.3 grams) of stearamidoethyl amine.

(13) The reaction product of 0.5 mole (43 grams) γ-butyrolactone with 0.48 mole (320 grams) of polymerized fatty acid octaethylene amine. The latter is available on the market under the brand name of Empol 1022 and is derived from essentially a $C_{36}$ dibasic acid resulting from the polymerization of naturally occurring unsaturated $C_{18}$ fatty acids. The general properties are as follows:

| | |
|---|---|
| Molecular weight, approx | 600 |
| Acid value, mg. KOH/g _____min__ | 180 |
| Saponification value, mg. KOH/g _____min__ | 185 |
| Neutralization equivalent | 289–304 |
| Dimer content _____percent__ | 75 |
| Trimer content _____do____ | 22 |
| Monomer content _____do____ | 3 |
| Sp. gr., 15.5° C | 0.95 |
| Viscosity at 25° C _____centistokes__ | 10,000 |

The thixotropic and thickening agents of the present invention are employed in all drying oil compositions, such as, paints, enamels, varnishes, as well as in the drying oils, resins, both natural and synthetic used in their manufacture, such as, for example, linseed oil, tung oil, varnish oil, rapeseed oil, sesame oil, sunflower seed oil, poppyseed oil, oil extracted from the kernels of nuts of the genus Juglans, unsaturated triglycerides, dehydrated castor oils, sap of Rhus verniciflua, perilla oil, oil of safflower, hempseed oil, walnut oil, oiticia, menhaden, sardine, pitchard oils; polybutadiene, synthetic ester oils, isomerized oils, maleic treated copolymer oils, alkyd resins and others, per se and in combination with each other and/or in combination with various diluents, solvents, extenders, driers, liquids, solids, such as pigments, dyes and other additive—customarily employed in drying oil or painting compositions. The amount of the thixotropic and thickening agent to be employed may range from 0.1 to 10%, based on the weight of the drying oil or drying oil composition, and will vary somewhat depending upon the type of paint, enamel, varnish or drying oil. In most instances an amount ranging between 1 and 3% is sufficient to impart the thixotropic and thickening properties. The exact gelling and thickening mechanism has not yet been clearly established. It is believed, however, to be related to the hydrogen bonding character of the various N-substituted-γ-hydroxycarboxylic acid amides.

Various paints and other drying oil compositions containing the thixotropic and thickening agents of the present invention exhibit rust inhibiting properties when applied on ferrous metals. When used in drying oils and paints, such as, linseed oil, alkyl resin paint, etc. the drying time is not retarded. The agents are of particular utility for the preparation of thixotropic alkyd resin type paints which brush well, dry well, have ample body, do not settle out readily, have controlled penetration on porous materials, and are applicable not only for coating on metal surfaces but non-metal surfaces, such as, wood, stucco, concrete, stone and the like. The unusual character of the resulting paints, varnishes, drying oils, etc. is that they brush on readily and smoothly, do not spill, sag or form skins in the can.

In preparing the new drying oil compositions of the present invention, the N-substituted-γ-hydroxycarboxylic acid amide is added to the paint, varnish, drying oil, etc. in an amount ranging between 0.1% and 10%, and the mixture heated to a temperature ranging between 50° C. to about 150° C. preferably slightly under the temperature at which the drying oil composition begins to boil. This will be governed by the boiling point of such extender that is present. Any temperature is satisfactory at which homogeneity occurs. At this point, the mixture is stirred well to assure a homogeneous mass, and then allowed to cool. In the case of some drying oil compositions, the rust inhibiting properties are enhanced by preparing the thixotropic agent by heating one mole of the N-substituted-γ-hydroxycarboxylic acid amide with one mole of an organic base, such as diethanolamine, triethanolamine, ethylethanolamine; butanolamine, dialkanolamine, trialkanolalkylamine, etc. for one hour at 150° C. with stirring, and then allowing the mixture to cool to room temperature. The resulting product is readily compounded with various types of surface coating compositions such as paints, varnish, drying oils, etc. by merely mixing and heating to a temperature slightly under which the surface coating composition will begin to boil, or to a temperature when solution occurs. The mixture is thereafter stirred to insure homogeneity and allowed to cool. In general, the rust inhibiting properties of the surface coating compositions prepared in accordance with the present invention are so good that the addition product with diethanol amine, etc. is not necessary.

In order to better disclose the invention in detail, the following examples are furnished. It is to be clearly understood that these examples are illustrative only and are not intended to limit the scope to the invention claimed.

Example I

The production of illustration (2) was composed at the 2% level in a regular, commercially available linseed oil base house paint having the following composition:

| Vehicle 33.5%: | Percent |
|---|---|
| Linseed oil | 56.2 |
| Heated treated linseed oil | 18.6 |
| Mineral spirits | 25.2 |
| Pigment 66.5%: | |
| Titanium dioxide | 15.8 |
| Zinc oxide | 15.8 |
| Calcium carbonate | 68.4 |
| Tinting pigments less than 5% | |

The mixture was warmed to a temperature of 80° C. At this point, the slurry was stirred and then allowed to cool to room temperature. About an hour later, it was noted that the cooled slurry was transformed into a firm gel which was quite immobile under the influence of gravity in that when the container was inverted no paint flowed out for an indefinite period. The resulting paint when applied with a brush was found to adhere exceptionally well to the brush and possessed the usual desirable properties in that it liquefied appreciably and thus brushed on easily and smoothly.

Example II

Example I was repeated with the exception that the production of illustration (7) was employed at the same percentage level. The resulting paint brushed on easily and smoothly.

Example III

Raw linseed oil was compounded with 2% of the product of illustration (8) by first heating to 65° C. When cooled to room temperature, the solution was a clear, transparent, stiff gel with no ability to pour under the force of gravity. It had excellent brushability, literally melting under the light effort with the paint brush.

When the compounded linseed oil was subjected to the well known test advocated by Baker & Zisman described in Ind. Chem. 40, 2338 (1948), and 41, 137 (1949), by submerging an indented 1020 steel panel in a vessel of the oil and a drop of water placed in the indentation and the temperature held at 68° C. for 48 hours, there was no visible sign of rust.

*Example IV*

Example III was repeated with the exception that the product of illustration (8) was replaced by an equivalent amount of the product of illustration (4). The test indicated no visible sign of rust.

*Example V*

Example III was again repeated with the exception that the product of illustration (8) was replaced by an equivalent amount of the product of illustration (7). The test indicated no visible sign of rust.

It is to be noted that in the tests of Examples IV and V the conditions therein are considered severe rusting environments.

*Example VI*

The product of illustration (10) was mixed at 3% level with an alkyd resin paint having the following composition:

| | |
|---|---|
| Titanium calcium | 32.5 |
| Titanium dioxide | 7.5 |
| Calcium carbonate | 20 |
| Alkyd resins | 15 |
| Petroleum spirits | 24.7 |
| Driers | 0.3 |

The mixture was heated to about 110° C., cooled and aged over night. At the end of this period, the product was a thixotropic bodied paint which was unmovable by the force of gravity when the container was inverted, but which adhered well to the brush and which brushed well in that it liquefied appreciably upon movement and had all other desirable properties of paint.

From the foregoing example it becomes clearly manifest that in view of the diverse nature of the R group in the aforementioned general formula that the presence of an organic base is not necessary for the thixotropic effect.

*Example VII*

The product of illustration (4) was mixed with both a linseed oil base paint and an alkyd resin type paint of Examples I and VI at 3% level and the two individual mixtures heated to about 115° C., stirred and cooled. In each case the resulting drying oil composition was a smooth thixotropic paste-like material suitable for application with a trowel or pallet knife. When applied as a thin layer both products dried in approximately the normal fashion when compared with the untreated paints.

*Example VIII*

The product of illustration (7) was compounded at a 3% level with an alkyd resin type paint employed in Example VI, heated to a temperature slightly over 100° C., cooled and examined. The product was considerably thickened and sufficiently mobile to move slowly in response to the force of gravity when the container was inverted. Upon thoroughly stirring the material, the viscosity was lost but to only a small noticeable extent. The viscosity at this point was 12,000 centipoises, whereas the viscosity of the original paint was 2,000 centipoises.

While this particular product would appear too viscous to brush as a paint, it definitely illustrates the pronounced thickening effect of the additive. Thus variations desired in finished products may be controlled by the selection of the additives as shown in illustrations (1) to (13) inclusive.

*Example IX*

Example VIII was again repeated with the exception that the product of illustration (7) was replaced by an equivalent amount of the product of illustration (9) with the same results.

*Example X*

The compound of illustration (10) was mixed at a 3% level with a varnish consisting of a mixture of turpentine and mineral spirits 50% and tung oil and alkyd resin 50%, and the whole heated to a temperature slightly over 100° C., cooled and examined. The resulting product was considerably thickened and sufficiently mobile to move slowly in response to the force of gravity when the container was inverted. Upon thoroughly stirring this material the viscosity loss was of a small extent. At this point the viscosity was 12,000 centipoises whereas the original viscosity was 2,000 centipoises.

We claim:

1. A drying oil composition containing from about 0.1 to 10% of a thixotropic and thickening agent to cause at least a partial gellation thereof, said agent consisting of at least one N-substituted-γ-hydroxycarboxylic acid amide having the following general formula:

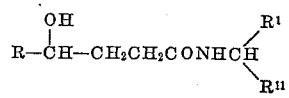

wherein R represents a member selected from the class consisting of hydrogen and methyl groups, $R^1$ represents a member selected from the class consisting of alkyl radicals containing from 10 to 22 carbon atoms, aryl and aralkyl radicals containing from 7 to 24 carbon atoms, $R^{11}$ represents a member selected from the class consisting of hydrogen, an aliphatic radical containing from 10 to 22 carbon atoms, an alkyl and aralkyl radical containing from 7 to 24 carbon atoms, the total number of carbon atoms consisting the groups in both $R^1$ and $R^{11}$ being at least 10 and not more than 24 carbon atoms.

2. A drying oil composition containing from about 0.1 to 10% of a thixotropic and thickening agent to cause at least a partial gellation thereof, said agent having the following formula:

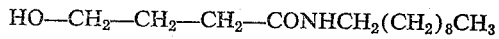

3. A drying oil composition containing from about 0.1 to 10% of a thixotropic and thickening agent to cause at least a partial gellation thereof, said agent having the following formula:

4. A drying oil composition containing from about 0.1 to 10% of a thixotropic and thickening agent to cause at least a partial gellation thereof, said agent consisting of the reaction product of 1 mole of γ-butyrolactone with 1 mole of a mixture of amines having the following composition:

| | Percent |
|---|---|
| Hexadecylamine | 10 |
| Octadecylamine | 10 |
| Octadecenylamine | 35 |
| Octadecadienylamine | 45 |

5. A drying oil composition containing from about 0.1 to 10% of a thixotropic and thickening agent to cause at least a partial gellation thereof, said agent consisting of the reaction product of 1 mole of γ-butyrolactone and 1 mole of a mixture of amines having the following composition:

| | Percent |
|---|---|
| Octadecenylamine | 15 |
| Octadecadienylamine | 15 |
| Abietylamine | 70 |

6. A drying oil composition containing from about 0.1 to 10% of a thixotropic and thickening agent to cause at least a partial gellation thereof, said agent consisting of the reaction product of 1 mole of γ-butyrolactone and 1 mole of a mixture of amines having the following composition:

| | Percent |
|---|---|
| Hexadecylamine | 6 |
| Octadecylamine | 93 |
| Octadecenylamine | 1 |

References Cited in the file of this patent

UNITED STATES PATENTS 2,548,156    Gresham _____ Apr. 10, 1951